United States Patent
Gossain et al.

(10) Patent No.: US 8,811,234 B2
(45) Date of Patent: Aug. 19, 2014

(54) SYSTEM AND METHOD TO PROVIDE DIFFERENTIATED ROUTING IN MULTI-HOP MULTI-RADIO WIRELESS NETWORKS

(75) Inventors: Hrishikesh Gossain, Lake Mary, FL (US); Ian D. Chakeres, Columbus, OH (US); Ravindra Guntur, Mysore (MY); Avinash Joshi, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 335 days.

(21) Appl. No.: 13/406,298

(22) Filed: Feb. 27, 2012

(65) Prior Publication Data

US 2012/0147780 A1 Jun. 14, 2012

Related U.S. Application Data

(62) Division of application No. 12/474,708, filed on May 29, 2009, now Pat. No. 8,149,717.

(51) Int. Cl.
*H04L 12/28* (2006.01)

(52) U.S. Cl.
USPC ...................................................... 370/256

(58) Field of Classification Search
CPC . H04L 41/085; H04L 12/5689; H04L 12/569; H04L 45/00; H04L 45/16; H04L 45/20
USPC ......... 370/218, 235, 237, 238, 252, 253, 254, 370/337, 338, 395.21, 401, 353, 256, 328
See application file for complete search history.

(56) References Cited

U.S. PATENT DOCUMENTS

| | | | |
|---|---|---|---|
| 6,661,797 B1 * | 12/2003 | Goel et al. | 370/395.21 |
| 6,714,787 B2 | 3/2004 | Reed et al. | |
| 6,757,263 B1 | 6/2004 | Olds | |
| 8,149,717 B2 * | 4/2012 | Gossain et al. | 370/238 |
| 2006/0250959 A1 * | 11/2006 | Porat | 370/230 |
| 2007/0115829 A1 * | 5/2007 | Strutt et al. | 370/238 |
| 2007/0127386 A1 | 6/2007 | Joshi et al. | |
| 2007/0248067 A1 * | 10/2007 | Banerjea et al. | 370/338 |
| 2008/0205312 A1 | 8/2008 | Metke et al. | |
| 2008/0316997 A1 | 12/2008 | Zeng et al. | |
| 2009/0154340 A1 * | 6/2009 | Kumaresan et al. | 370/218 |
| 2010/0136988 A1 | 6/2010 | Dewasurendra et al. | |
| 2010/0246480 A1 * | 9/2010 | Aggarwal et al. | 370/328 |

OTHER PUBLICATIONS

C. Hedrick, "Routing Information Protocol," Jun. 1988.
Chakeres, I., et al., "Calculating a Next-hop Metric in Multiradio Networks," IEEE, International Conference on Networks, Dec. 12-14, 2008, 5 pages.
Couto, D., et al., "A High-Throughput Path Metric for Multi-Hop Wireless Routing," 9th ACM International Conference, Mobile Computing and Networking (MobiCom '03) San Diego, CA, Sep. 2003.

(Continued)

*Primary Examiner* — Raj Jain
(74) *Attorney, Agent, or Firm* — Randi L. Karpinia

(57) ABSTRACT

A method provides for differentiating usage permissions between different categories of communication traffic within a given network. The method includes ensuring one or more categories of traffic never transits communication radios, link, and/or spectrums dedicated to a different category of traffic. A combined routing metric is calculated using a scaling factor for discouraging usage of restricted communication links and encouraging usage of non-restricted communication links.

5 Claims, 5 Drawing Sheets

(56) References Cited

OTHER PUBLICATIONS

Draves,R., et al., "Routing in Multi-radio, Multi-hop Wireless Mesh Networks," 10th Annual International Conference, Mobile Computing and Networking (MobiCom '04), Sep. 26-Oct. 1, 2004.
J. Moy, "OSPF Version 2," RFC 2328, Apr. 1998.
Notice of Allowance mailed Nov. 28, 2011 in counterpart U.S. Appl. No. 12/474,708, Hrishikesh Gossain, filed May 29, 2009.
Perkins, C., et al., "Ad hoc On-Demand Distance Vector (AODV) Routing," RFC 3561, Jul. 2003.
Thaler, D., et al., "Multipath Issues in Unicast and Multicast Next-Hop Selection," RFC 2991, Nov. 2000.

* cited by examiner

SYSTEM AND METHOD TO PROVIDE DIFFERENTIATED ROUTING IN MULTI-HOP MULTI-RADIO WIRELESS NETWORKS

CROSS-REFERENCE TO RELATED APPLICATION

The present application is a divisional application of, and claims priority of, previous U.S. patent application Ser. No. 12/474,708, entitled SYSTEM AND METHOD TO PROVIDE DIFFERENTIATED ROUTING IN MULTI-HOP MULTI-RADIO WIRELESS NETWORKS, filed May 29, 2009, and assigned to Motorola Solutions, Inc.

FIELD OF THE DISCLOSURE

The present disclosure relates generally to wireless communications and more particularly to routing of messages within multi-hop multi radio wireless networks.

BACKGROUND

An infrastructure-based wireless network typically includes a communication network with fixed and wired gateways. Many infrastructure-based wireless networks employ a mobile unit which communicates with a fixed base station or access point that is coupled to a wired network. The mobile unit can move geographically while it is communicating over a wireless link to the base station or access point. When the mobile unit moves out of range of one base station or access point, it may connect or "handover" to a new base station or access point and starts communicating with the wired network through the new base station or access point.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination. Nodes in the ad hoc network use end-to-end path metrics to select a path, from the multiple path options to any destination. The path metrics are generally sum of the individual link metrics along the path.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul.

A multi radio communication device supports two or more different wireless interfaces. For example, a multi radio cellular telephone can provide Bluetooth communications and/or can support wireless fidelity (Wi Fi) along with its cellular data network.

A multi radio node within an ad hoc or mesh network can include multiple different radio modules (e.g., one radio module which complies with the Institute of Electrical and Electronics Engineers (IEEE) 802.11(a) standard, another radio module which complies with the IEEE 802.11(g) standard, and possibly another radio module which complies with the IEEE 802.11(b) standard, etc.). Each radio module typically has its own physical (PHY) layer, its own medium access control (MAC) layer.

The mesh network architecture is broadly composed of two processes: neighbor discovery and reactive routing. Neighbor discovery uses hello messages to determine neighbors and proactively propagate Internet Access Point (IAP) connectivity information. Reactive routing has many messages (e.g. route request (RREQ), route reply (RREP), route error (RERR), etc.) related to route discovery, route maintenance, and route binding.

To accommodate multiple radio operation, an enhancement to the mesh network architecture includes a node identification (ID) in hello messaging and in the neighbor table. This node ID is used to identify messages received from multiple radio interfaces as being from the same mesh node.

A public safety network is a wireless communications network used by emergency services organizations, such as police, fire and emergency medical services, to prevent or respond to incidents that harm or endanger persons or property. Many public safety organizations are turning to mobile communications and other networked applications to improve the efficiency of their workforce, including public safety personnel and first responders. Public safety networks are required to provide a high reliability flow of data to highly mobile workers.

Some networks provide combined operation for various categories of traffic. For example, some networks provide combined public safety and non-public safety operation. Within such a network, there is an additional network requirement of allowing high priority traffic across all radios, links, spectrums etc., while not allowing lower priority traffic across some dedicated high priority links. For example, in a network, public safety traffic may be allowed over both public safety radios and non-public safety radios, links, and/or spectrums, while non-public safety traffic may never be allowed across public safety specific radios, links, and/or spectrums.

Accordingly, there is a need for a system and method to provide differentiated routing in multi-hop, multi-radio wireless networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
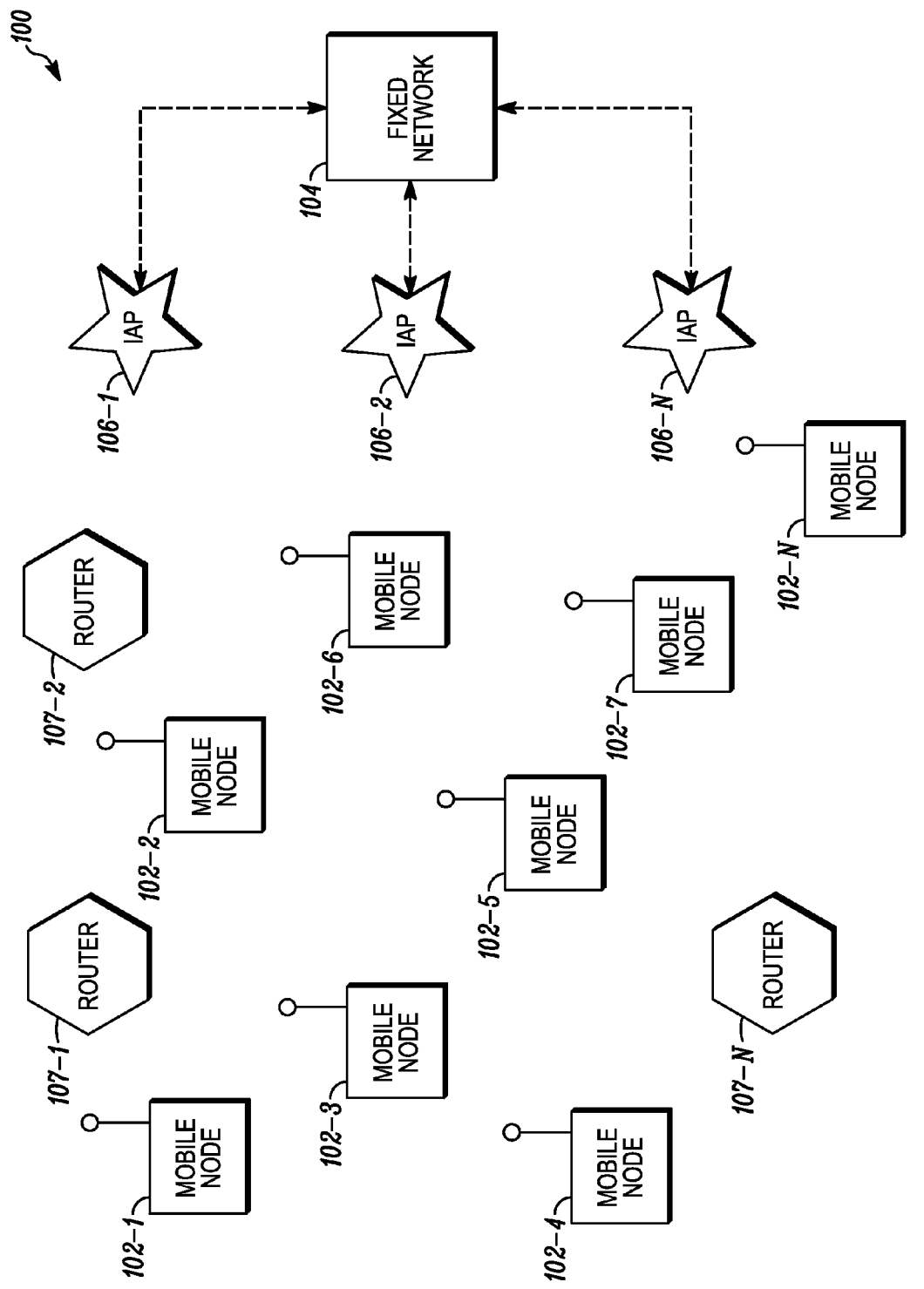
FIG. 1 is a block diagram illustrating an example of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments, a method is provided for determining a method for differentiating usage permissions between different categories of communication traffic within a given network. The method of some embodiments includes ensuring one or more categories of traffic never transits communication radios, link, and/or spectrums dedicated to a different category of traffic. The method provided is compatible with existing mesh network architectures, Institute of Electrical and Electronics Engineers (IEEE) 802.11s network architecture, and the like. Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

In accordance with one embodiment, one category of traffic is public safety traffic and another category of traffic is non-public safety traffic.

In accordance with some further embodiments, a method is provided for combining the link metrics of multiple parallel links during multi radio mesh operation for a particular next-hop mesh node.

In accordance with some further embodiments a method is provided for biasing the combined link metric in favor of links which are operating to support all categories of traffic.

FIG. 1 is a block diagram illustrating an example of a communication network 100. The communication network 100 can be a mesh enabled architecture (MEA) network, an IEEE 802.11 network (i.e. 802.11a, 802.11b, 802.11g, 802.11e or 802.11s), or any other packetized mesh communication network.

As illustrated in FIG. 1, the communication network 100 includes a plurality of mobile nodes 102-1 through 102-$n$ (referred to generally as nodes 102 or mobile nodes 102 or mobile communication devices 102), and can, but is not required to, include a fixed network 104 having a plurality of intelligent access points (IAP) 106-1, 106-2, ... 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed or mobile routers (MR) 107-1 through 107-$n$ (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes.

Mesh Network deployments are engineered to ensure an interconnected backhaul network of mesh routers. The mesh routers form a tree below a particular IAP. From a network graph perspective mesh network deployments tend to be fairly sparse and tree-like. This style of deployment is chosen to reduce the number of mesh routers required to cover a particular area and therefore reduce overall network cost.

A typical deployment consists of 8-15 mesh routers below an IAP. The maximum hop length between a MR and IAP is 4 hops. When multiple radios (e.g. 4.9 GigaHertz (Ghz) public safety radios and 5.8 Ghz non-public safety radios) are employed, these radios tend to form parallel redundant links between MR. Seldom if ever does one particular radio reach another MR, while another radio does not reach that same MR. Put another way, if two MR are neighbors on one radio they tend to be neighbors on other radios also (given that both MR have the same radio types).

When this fact about multiple radios is coupled with a sparse network deployment, we find that there are seldom alternate paths, from a node perspective, between any two MR. That is, the network graph tends to have the same node connectivity with only a single radio for backhaul, as when multiple radios are employed.

Figure 2:
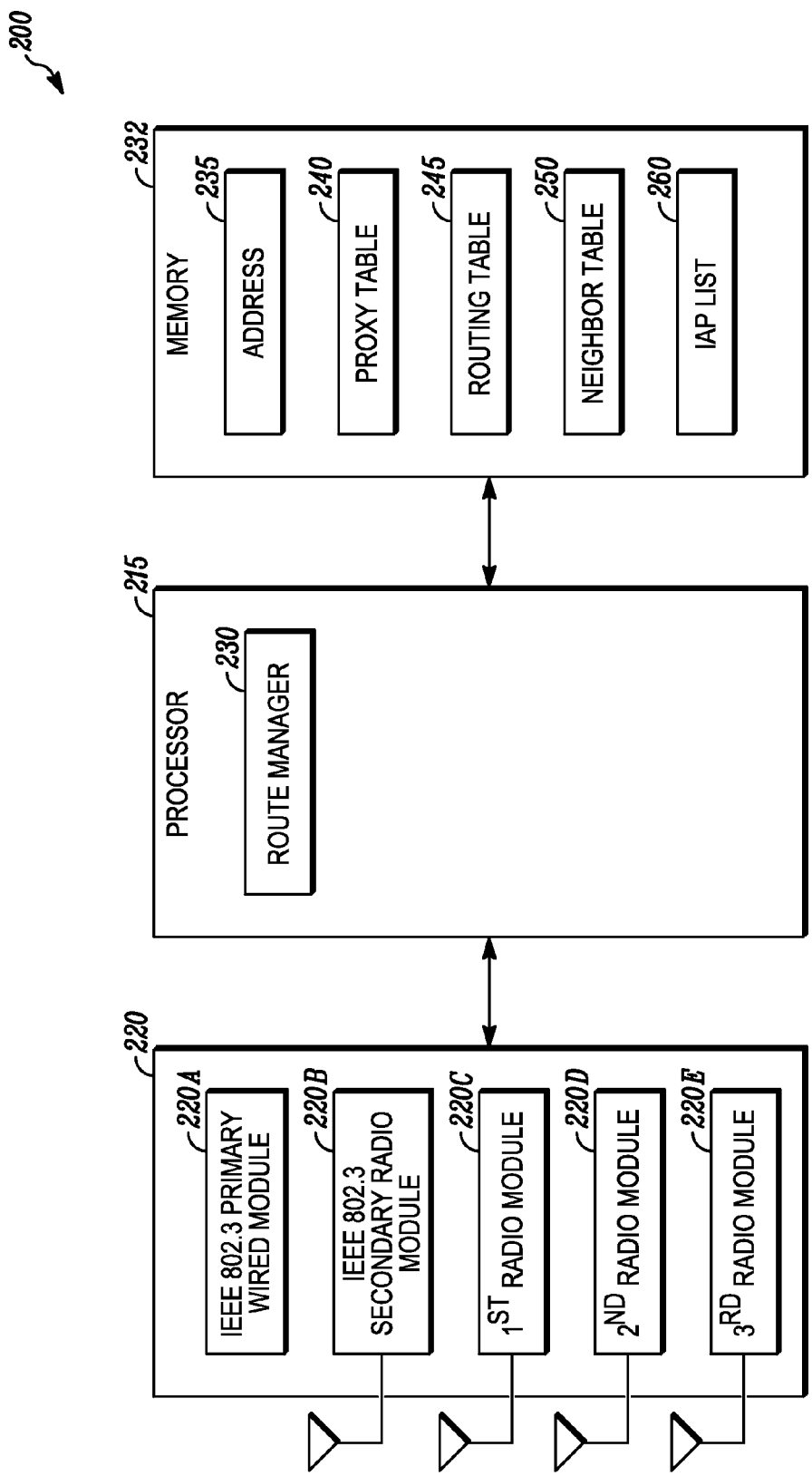
FIG. 2 is an electronic block diagram illustrating a multi-radio meshed node or communication device in accordance with some embodiments.

FIG. 2 is an electronic block diagram of a multi-radio meshed node or communication device 200 in accordance with some embodiments. The communication device 200, for example, can be one or more of the nodes 102, 106, and 107 of FIG. 1. In accordance with some embodiments; the communication device 200 can be referred to as "a mesh routable device." As illustrated, the multi-radio meshed device 200 includes a plurality of communication modules 220, a processor 215, and a memory 232.

Each of the communication modules 220 can be either a wired or a wireless communication module. For example, as shown, communication module 220A is an IEEE 802.3 primary wired module, while communication modules 220B through 220E are various radio modules. It will be appreciated by those of ordinary skill in the art that any number or combination of wired and/or wireless communication modules 220 can be included within a communication device 200 in accordance with implementation of the various embodiments.

It will further be appreciated that each of the communication modules 220 can operate over at least one frequency different from that of the other radio modules, and has a particular radio configuration which supports certain data rates or sets of data rates, and can use a particular medium access control (MAC) protocol different from that of the other radio modules such as as Carrier Sense Multiple Access With Collision Avoidance (CSMA/CA), Multiple Access with Collision Avoidance (MACA), Time Division Multiple Access (TDMA), Code Division Multiple Access (CDMA), Orthogonal Frequency Division Multiple Access (OFDMA) etc. Each of the radio modules 220A-220E includes its own physical (PHY) layer (not shown) and medium access control (MAC) layer (not shown) which comply with at least one radio network or radio network standard. Each PHY layer operates according to its own set of physical layer parameters (e.g., supported data rates, radio frequency (RF) channels, carrier spacing; modulation technique, coding techniques, etc.).

As illustrated, each of the communication modules 220A, 220B are illustrated as being compliant with the IEEE 802.3 standard in which communication module 220A is specifically for a wired communication link. Examples of standards which the radio modules 220C-220E may comply with can include, but are not limited to, IEEE 802.11 network standards including 802.11a, 802.11b, 802.11g, 802.11n, 802.11e or 802.11s, and IEEE 802.16 network standards including 802.16j, and IEEE 802.15 network standards including 802.15.3, 802.15.4, etc. Radio modules 2202C-220E may also comply with a proprietary radio network such as a mesh enabled architecture (MEA) network, or any other packetized mesh communication network.

In accordance with some embodiments, each of the communication modules 220 includes at least one of a transceiver and a transmitter and a receiver module. Further, each of the radio modules includes at least one antenna. Each antenna, or alternatively the transceiver directly in the case of a wired communication module, intercepts transmitted signals from one or more nodes 102, 106, 107 within the communication network 100 and transmits signals to the one or more nodes 102, 106, 107 within the communication network 100. The antenna is coupled to the transceiver, which employs conventional demodulation techniques for receiving and which employs conventional modulation techniques for transmitting communication signals, such as packetized signals, to and from the associated radio module within the multi-radio meshed device 200 under the control of the processor 215. The packetized data signals can include, for example, voice, data or multimedia information, and packetized control signals, including node update information. When a transceiver receives a command from the processor 215, the transceiver sends a signal via the antenna to one or more devices within the communication network 100. It will be appreciated by one of ordinary skill in the art that other similar electronic block diagrams of the same or alternate type can be utilized for the various communication modules 220. Each communication module 220 is operatively coupled to the processor 215 for supporting multi radio communication operations.

The processor 215 in some embodiments includes a route manager 230 for managing packet forwarding within the communication network 100. Although the route manager 230 can be contained within the processor 215 as illustrated, in alternative implementations, the route manager 230 can be an individual unit operatively coupled to the processor 215 (not shown). It will be appreciated by those of ordinary skill in the art that the route manager 230 can be hard coded or programmed into the node 200 during manufacturing, can be programmed over-the-air upon customer subscription, or can be a downloadable application. It will be appreciated that other programming methods can be utilized for programming the route manager 230 into the multi-radio meshed device 200. It will be further appreciated by one of ordinary skill in the art that route manager 230 can be hardware circuitry within the multi-radio meshed device 200.

To perform the necessary functions of the multi-radio meshed device 200, the processor 215 and/or the route manager 230 are each coupled to the memory 232, which preferably includes a random access memory (RAM), a read-only memory (ROM), an electrically erasable programmable read-only memory (EEPROM), and flash memory. It will be appreciated by those of ordinary skill in the art that the memory 232 can be integrated within the multi-radio meshed device 200, or alternatively, can be at least partially contained within an external memory such as a memory storage device. The memory 232 comprises an address table 235, proxy table 240, routing table 245, and a neighbor table 250.

The address table 235 includes storage locations for the storage of one or more identifying addresses such as the Node ID of the multi-radio meshed device 200 and MAC addresses of the particular MAC modules in each radio module 220A-220E of the multi-radio meshed device 200. In accordance with embodiments of the present invention, the multi-radio meshed device 200 needs a unique Node ID to identify the multi-radio system as a single node even though, there may be more than one MAC module controlled by the route manager 230 (also referred to as a mesh routing core (MRC)), and each MAC module has its own unique MAC address (e.g., different MAC addresses for each MAC module). As used herein, the term "node ID," refers to the unique ID identifying the multi-radio meshed device 200. As used herein, the term "interface MAC address," refers to a MAC address of a particular communication module 220A-220E within the multi-radio meshed device 200. Each communication module 220A-220E in the multi-radio meshed device 200 and its corresponding MAC module has its own interface MAC address. In one embodiment, the "interface MAC address," of the MAC module which powers up first is also used as the "node ID," which identifies the multi-radio meshed device 200. In order to avoid node identifier module confusion due to failure of the first MAC, the "node ID" which identifies the multi-radio meshed device 200 will not be changed as long as the multi-radio meshed device 200 is alive. Thus, once the device 200 is powered up, it keeps the same node ID and will not change it due to the failure of any MAC module in this device. Each multi-radio meshed device 200 will maintain single destination sequence number for itself.

Because the multi-radio meshed device 200 is a routable or "meshed" device/node, the memory 232 further includes storage locations for maintaining or storing a proxy table 240 and a routing table 245. The routing table 245 and the proxy table 240 are maintained to identify a non-routable or non-meshed device 200 and its corresponding AP (routable device) 205; non-meshed devices are proxied by meshed devices. These tables can also be combined to create a single forwarding table.

To do the proxy routing for the non-routing devices, the route manager 230 of multi-radio meshed device 200 also maintains a proxy table to store all the information regarding the proxy nodes associated with this multi-radio meshed device 200 through different interfaces. The proxy table 240 typically contains an entry for each device that is associated with the multi-radio meshed device 200 (e.g., each device that is being proxied by the multi-radio meshed device 200). A multi-radio meshed device 200 can also have nodes or devices associated with it through a wired Ethernet port or through some other wired/wireless protocol like IEEE 802.15, Token Ring, or the like as can be appreciated by one skilled in the art. A proxy table 240 of a multi-radio meshed device 200 may also contain entries for non-meshed devices that are associated with other nodes but use that node as an intermediate node to communicate with other devices in the network.

The route manager 230 maintains a routing table 245 to store the route information concerning routes to other meshed devices. The node 200 constantly updates its routing table 245 so as to maintain a consistent and up-to-date view of the network. When the network topology changes the nodes propagate update messages throughout the network in order to maintain consistent and up-to-date routing information about the whole network. These routing protocols vary in the method by which the topology change information is distributed across the network and the number of necessary routing-related tables.

As will be appreciated by those of ordinary skill in the art, in contrast to single-radio routing architectures, the data structures used in this multi-radio routing architecture also maintain related interface MAC addresses in addition to the node ID. The route manager 230 of the multi-radio meshed device 200 consults both the proxy table 240 and the routing table 245 to determine how to forward a data packet it has either generated or has received.

The route manager 230 also maintains a neighbor table 250 in memory 232 that contains the most current information about the neighbor nodes of the multi-radio meshed device 200. The multi-radio meshed device 200 maintains a list of neighbor nodes in the neighbor table 250. Neighbor nodes are added to the neighbor table 250 when the multi-radio meshed device 200 receives a communication from a neighbor node which indicates that the particular neighbor node is in communication range of the multi-radio meshed device 200. For example, in one implementation, a neighbor node will be added to the neighbor table 250 if the multi-radio meshed device 200 receives a HELLO message from that neighbor node. The route manager 230 maintains separate expiry timers for each neighbor on each interface. These expiry timers are updated every time a HELLO message is heard (or another directed message is received) from the neighbor node on that interface. Thus, in contrast to single-radio routing architectures, the data structures used in this multi-radio routing architecture also maintains interface information for each neighbor node.

In accordance with some embodiments, when a hello message is received, the type of link (i.e. what category or categories of traffic can operate on the link) over-which it was received is recorded in the neighbor table 250, and the information in the IAP list 260 is updated. Updates to these tables may also impact the combined routing metric, IAP list sorting, and therefore the best IAP.

It will be appreciated by those of ordinary skill in the art that the network may choose to not implement a combined routing metric; thereby maintaining the status quo architecture where only the best link is utilized.

The following fields, for example, and in accordance with some embodiments, can be included in an entry in the neighbor table 250:
  Node ID of neighbor
  Device type of the neighbor (which can be SD, WR or IAP)
  Node ID of the IAP to which neighbor is bound (only in infrastructure state)
  Number of hops of the neighbor from its bound IAP (only in infrastructure state)
  Routing Metrics from the neighbor to its bound IAP (only in infrastructure state)
  Interface list
    Local Interface MAC Address (the interface from which the neighbor is heard)
    Neighbor Interface MAC Address (the interface from which the neighbor is advertised in the neighboring node)
    Routing metrics to the neighbor on this link
    Link quality between the current node and the neighbor on this link (provided and updated by Autonomous Transport Protocol (ATP) on this interface, for example)
    Lifetime (expiration or deletion time of the neighbor on this interface)
    Link type (for example: PS-link or ANY-link)

The following fields, can be included, for example, and in accordance with some embodiments, in a sorted IAP list 260:
  IAP address
  Neighbor list
  Neighbor
  Combined metric
  Combined ANY-links metric It will be appreciated by those of ordinary skill in the art that the IAP list and neighbor list in accordance with some embodiments are sorted based on the best combined metric.

Overview

In accordance with some embodiments, a method is provided for multiple modifications to the mesh network code base to implement differentiated routing. First, high priority traffic is identified and tagged for quick future identification by other mesh routers (MR) processing this packet as it is forwarded. Second, neighbor discovery and route discovery are modified. Third, interface selection decisions are chosen based upon the type of traffic during forwarding.

To identify high priority traffic, first-hop MRs mark packets with a tag, for example, an 802.1p tag. The inspection and marking process, as well as several alternatives, are described in herein below. Routing control traffic is also similarly marked.

To enable a node to intelligently choose the next-hop and radio/interface to use for each packet transmission, modifications to the hello messaging, IAP selection and routing protocol control traffic processing are also provided. For hello messages, the IAP information is selectively advertised. For IAP selection, the metric by which the IAP list is sorted must be modified. These modifications ensure that lower priority traffic will not transit links dedicated to the high priority traffic to reach the IAP.

To achieve a similar effect during reactive routing, routing control packets are intelligently broadcast or unicast on only legally allowable interfaces based upon the 802.1p tag. This ensures that the high priority traffic links will be excluded from route discovery (and maintenance) for non-high priority traffic, while all links (high priority traffic-links and ANY-links) are available for the high priority traffic. A detailed description of the methods in accordance to some embodiments is described herein below.

Further, during unicast forwarding each node makes an intelligent transmission decision about which interface to utilize to reach the next-hop node. This procedure is described herein below also.

Link Metrics and a Combined Metric

In multi-radio node networks, there are often multiple parallel radio links connecting a node/device to nearby nodes/devices. For example, two mobile phones may be able to communicate over both an IEEE 802.11 radio and a Bluetooth radio simultaneously. In this scenario, both radio links could be utilized to improve the communication performance between the two devices.

In order to enable devices to utilize multiple parallel radio links, a combined next-hop metric that can be compared with other devices' next-hop metric is provided herein. The routing protocol can then use the combined metrics to choose the best next-hop among several opportunities; in the same way routing protocols currently use link or path metrics. A combined next-hop metric enables routing to make intelligent next-hop decisions taking advantage of parallel link opportunities.

Figure 3:
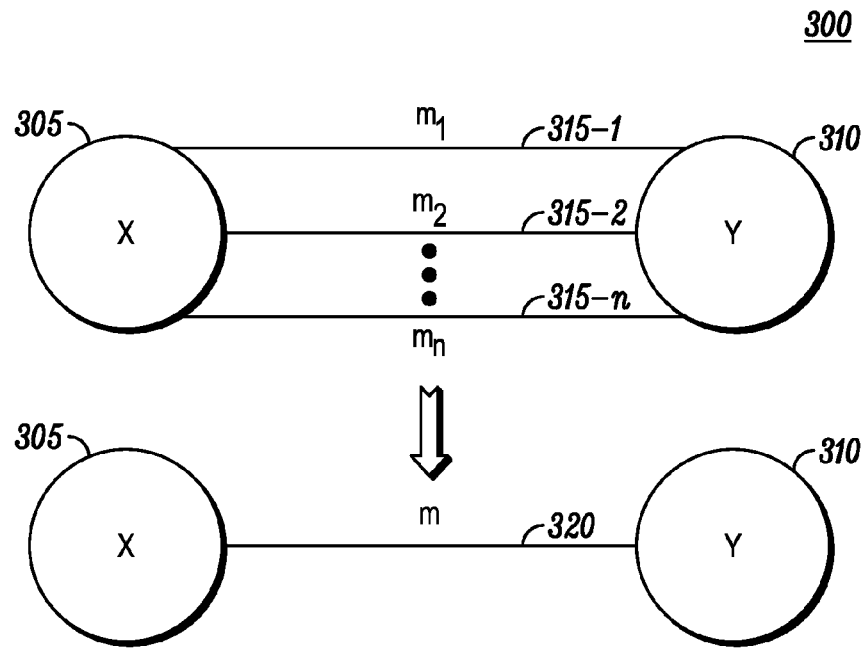
FIGS. 3 through 5 and FIG. 7 are block diagrams illustrating a portion of a communication network and the implementation of various embodiments thereof.

FIG. 3 illustrates a system 300 in which two mesh routers, mesh router X (MR305) and mesh router Y (MR310) share multiple communication links 315-1,2, ... n. The system 300, for example, can be a portion of the communication network 100 of FIG. 1. Each link in the system 300 has a link metric $m_n$. The link metric $m_n$ for each link represents the amount of time it takes to transmit one unit of data across link n between node X 305 and node Y 310. The link metric is able to abstract and incorporate many different wireless radio factors. For example, the link metric is able to abstract the physical transmission data rate, the frame error rate, the number of retransmissions, and the medium access time.

A combined next-hop metric 320 can be illustrated as in equation 1:

$$m = f(m_1, m_2, \ldots, m_n) \qquad (1)$$

To derive a function to combine multiple link metrics properly, it will be appreciated that one would start with the amount of time it takes to transmit one unit of data on link n between node X 305 and node Y 310:

$$m_n \qquad (2)$$

Inverting Equation 2 provides the amount of data that can be transmitted in one unit of time on link n between node X 305 and node Y 310:

$$\frac{1}{m_n} \qquad (3)$$

Summing Equation 3 across all links provides the combined amount of data that can be transmitted in one unit of time using all links between node X 305 and node Y 310:

$$\sum \frac{1}{m_n} \qquad (4)$$

Inverting Equation 4 yields the combined amount of time it takes to transmit one unit of data using all links between node X 305 and node Y 310. In other words, the combined next-hop metric 320 can be calculated as:

$$\frac{1}{\sum \frac{1}{m_n}} \qquad (5)$$

Considering Link-Type in the Combined Metric

The analysis herein before made no distinction among various link types such as those restricted to high priority traffic versus those that can be utilize for any type of traffic (for example: PS-links and ANY-links will be used for the calculation below for purposes of illustration only). As the combined metric will be used to sort and select an IAP, the link-type of each link optimally should be included in the combined metric calculation. Therefore, taking into account link type, the following equation can be used to create the combined metric:

$$m = \frac{1}{\sum \frac{1}{m_{n\text{-}any}} + \frac{1}{\alpha} \sum \frac{1}{m_{n\text{-}ps}}} \qquad (6)$$

Where: $m_{n\text{-}any}$ represents ANY-links' metrics, $m_{n\text{-}ps}$ represents PS-links' metrics, and $\alpha$ is a scaling factor that impacts the weight of PS-links.

In accordance with some embodiments, the combined metric for the ANY-links is recorded for selected advertisement during Hello messages. This portion of the calculation is shown in Equation 7:

$$m_{any} = \frac{1}{\sum \frac{1}{m_{n\text{-}any}}} \qquad (7)$$

Figure 4:
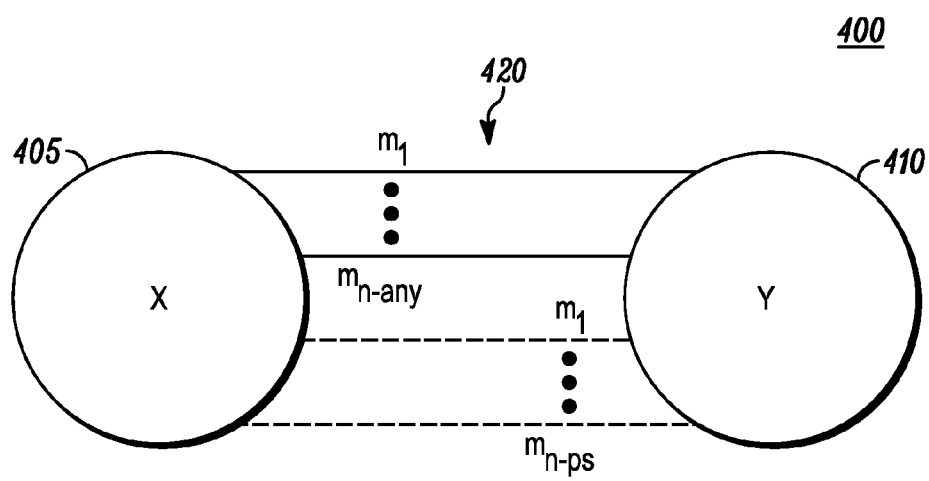

An example scenario 400 with heterogeneous links 415 between node X 405 and node Y 410 is illustrated in FIG. 4. Using Equation 6, $\alpha$ can be used to discourage PS-links from having a low combined metric. To have this effect $\alpha$ should be a positive number.

Scaling Factor

Figure 5:
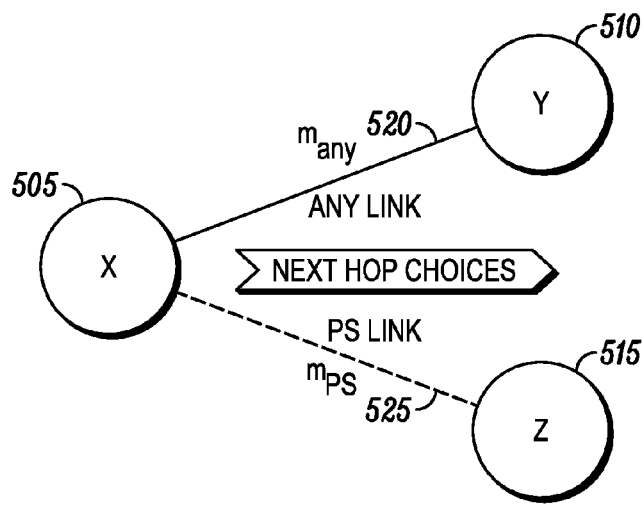

In accordance with some embodiments, the scaling factor $\alpha$ can be selected by deciding upon a particular factor to encourage the ANY-links metric in comparison to the category-specific links metric (i.e. the PS-links metric in the examples). For example, as shown in FIG. 5, node X 505 has a choice between two next-hop nodes, node Y 510 and node Z 515. The scaling factor $\alpha$ can be selected to cause ANY-links metric $m_{any}$ of the ANY-link 520 to be smaller than the $\alpha$ scaled PS-links metric $\alpha m_{ps}$ of the PS-link 525. It will be appreciated by those of ordinary skill in the art that the scaling factor $\alpha$ is best intelligently chosen by a domain expert.

By way of example, presume that half of a network utility is derived from a first category of traffic and the other half from a second category of traffic. It will be appreciated by those of ordinary skill in the art, that although only two categories are described for purposes of illustration, any number of categories of traffic can be operated within the methodology of the embodiments herein. The first category, for example, may be PS-traffic and the second category may be non-PS-traffic. Given the option between a PS-link 525 and an ANYlink 520 to different next-hop nodes (as shown in FIG. 5) the PSlink's utility is half that of the ANY-link 520. Therefore, given equal metrics the ANY-link 520 is preferred. Going further, if the PS-link 525 is capable of transporting twice as much data as the ANY-link 520, then choosing the PS-link 525 will achieve a comparable utility to that of the ANY-link 520. Therefore, setting $\alpha$ to two (2) is a good choice. By setting $\alpha$ to two (2), the use of PSlinks is discouraged due to artificially inflating the amount of time they take to transport packets by a factor of two; which is proportional to their utility.

Network Operation

Figure 6:
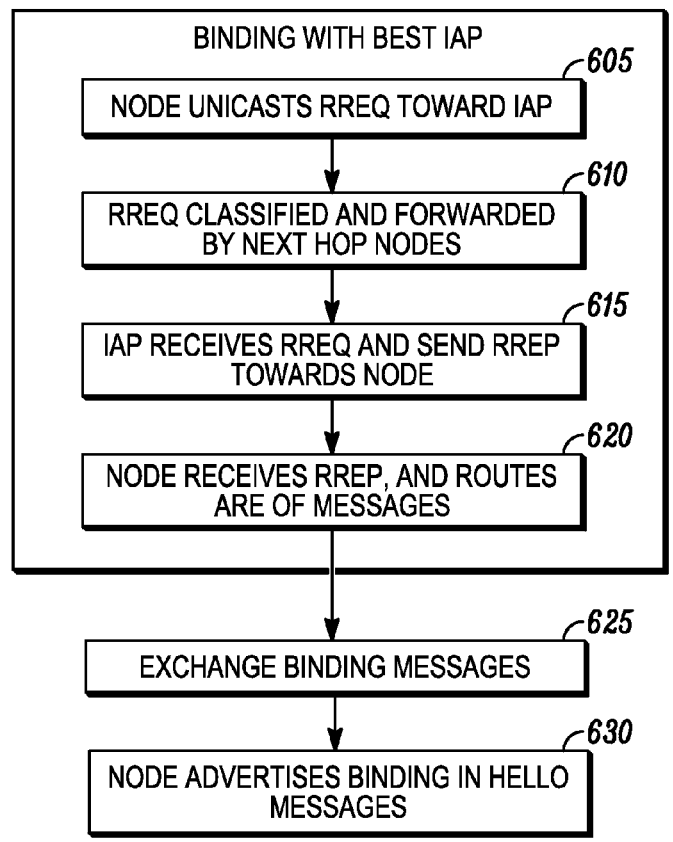
FIG. 6 is a flowchart illustrating a network operation in accordance with some embodiments.

FIG. 6 is a flowchart illustrating the operation 600 of a communications network in accordance with some embodiments. As illustrated, the operation begins with a node binding with a best IAP in the communications network via Steps 605 through 620. In Step 605, a Route Request (RREQ) is unicast from the node towards the best IAP through one or more intermediary (next hop) nodes. Next, in Step 610, within each intermediary node, the RREQ is classified, and then transported towards the next-hop continuing until it reaches the IAP. In Step 615, the IAP receives the RREQ and in response sends a route reply (RREP) towards the node through various intermediary nodes. Next, in Step 620, after the node receives the RREP, routes exist between the node and the IAP. Next, in Step 625, after a route to the IAP has been formed, binding messages are periodically exchanged.

In Step 630, after binding with the best IAP, the node can begin advertising the IAP binding in hello messages. Currently bound IAP information can include, for example, a currently bound IAP address and a next-hop neighbor address.

For hello messages that are to be transmitted on traffic category restricted links (for example: PS-links), IAP binding information (for example: Node ID, and/or number of hops) is transmitted. The combined routing metric is included. Hello messages are only transmitted on ANY-links if the IAP binding next-hop neighbor is reachable via an ANY-link. This restriction is required since only next-hop information is maintained, not complete route information. If the node were to advertise reachability over an ANY-link that depends on an upstream traffic category restricted link (for example: a PS-link), the node might have other nodes connected to its ANY-link and expect it to forward the traffic restricted from using the traffic category restricted link (for example: non-PS-traffic). If traffic that is restricted from using the traffic category restricted link (for example: non-PS-traffic) were received, it would have to be discarded as the node is connected to its IAP via a traffic category restricted link only (for example: a PS-link).

If the IAP is reachable via an ANY-link the combined routing metric for its ANY-link(s) ($m_{any}$ shown in Equation 7) is included.

By using this procedure, routes to the IAP will be discovered over a topology including both restricted and non-restricted traffic links (for example both PS-links and ANY-links) for traffic within the category that can operate over the traffic restricted link (for example: PS traffic). For other traffic, routes to the IAP will only be discovered over a topology of ANY-links.

Exclusion of Certain Paths

Figure 7:
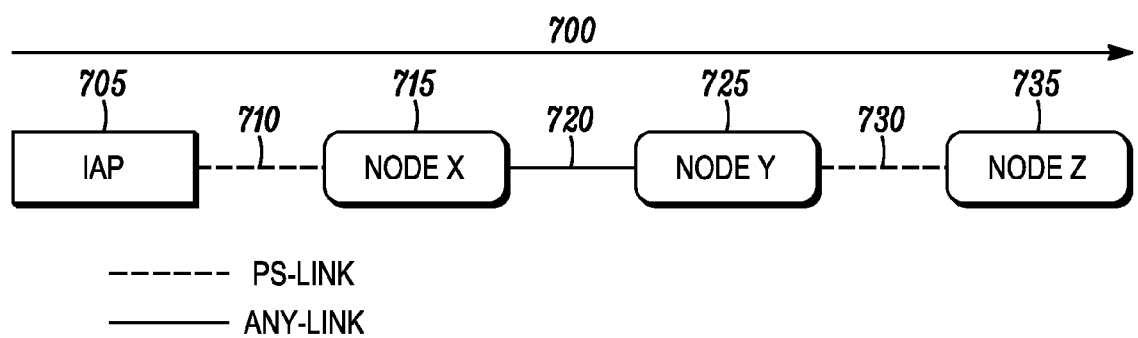

For certain legitimate paths IAP binding may not be possible using the methods described above. An example of this situation is depicted in FIG. 7. In this example, a path 700 including an IAP 705 communicating via a PS-link 710 to a node X 715 which is communicating via an ANY-link 720 to a node Y 725 which is communicating via a PS-link 730 to a node Z 735 is a reasonable path for PS traffic, but it is specifically excluded using the proposed algorithm. The path is excluded because node X 715 will not propagate the IAP information over its ANY-link 720, since that information was only received over a PS-link 710. Note that, the path 700 is not usable for non-PS-traffic.

To allow for more complex topologies, additional routing information can be propagated further (e.g. two-hop routing information). Another alternative is to utilize a complete multiple topology routing algorithm.

Packet Classification and Marking

If a node has both traffic category restricted links and ANY-links, its own traffic can be tagged as a particular category of traffic, for example, with an 802.1p tag. If a node has only ANY-links its own traffic can be tagged as non-high priority traffic. If a node is manually configured to create and forward high priority traffic it can be configured to tag its own packets as high priority traffic.

Packets arriving at a node from other devices are classified by traffic type. Classification occurs based on the tag, already carried in a packet, the received interface type, or by looking up the source and destination identifications or addresses.

If a packet does not contain a tag and was received over a traffic restricted category link, it is classified as that restricted category of traffic and a tag is added. Logically, if the sender is transmitting on a traffic restricted category link, it can be considered a device operating within that restricted category.

If a packet does not contain a tag and was not received over a traffic restricted category link, then the source and destination identifications and addresses are examined.

An address table is populated with an entry each time a new device is authenticated by the network. Using this table, if the source Node ID of the packet is found in an address table identifying nodes operating within a high priority, restricted category, and the like, a tag is added. Similarly, if the destination Node ID of the packet is found in an address table identifying nodes operating within a high priority, restricted category, and the like, a tag is added.

As a network optimization, only nodes with end devices need to be populated with the restricted category or high priority device address table. While forwarding packets tags are added by these nodes which form the edge of the mesh backhaul.

In accordance with an alternate embodiment, instead of utilizing a tag such as an 802.1p tag, (type of service) TOS-bits could be utilized for tagging. In accordance with another alternate embodiment, instead of utilizing an 802.1p tag or TOS-bits, each node could maintain an address table of all high priority or restricted category devices. At each node hop, the node could inspect the packet to determine the category of traffic, for example, if it is high priority or low priority traffic (i.e.: PS-traffic or non-PS-traffic).

Routing to Peers

When a peer route needs to be setup, the originating node broadcasts a RREQ. The node determines what category of traffic this route is for. (for example: PS-traffic or non-PS-traffic) and adds a tag, for example an 802.1p tag. For PS-traffic the RREQ is broadcast on both PS-links and ANYlinks. For non-PS-traffic the RREQ is broadcast on ANY-links only.

After processing, when a node is forwarding a RREQ out its interfaces it examines the tag to determine the category of traffic the RREQ is for. (For example: PS-traffic or non-PS-traffic). For PS-traffic RREQ, the RREQ is broadcast on both PS-links and ANY-links. For non-PS-traffic RREQ, the RREQ is broadcast on ANY-links only.

When a RREP is sent a tag is added to indicate the category of traffic the RREP is for. (For example: PS-traffic or non-PS-traffic). The tag is examined during forwarding of the RREP. At each hop the best available link toward the destination is chosen. For PStraffic RREP, both PS-links and ANY-links are available. For non-PS-traffic RREP, only ANY-links are available.

Route Maintenance

When a route error/route warn (RERR/RWARN) message is broadcast, the RERR/RWARN message should be broadcast only on interfaces with precursor nodes.

Forwarding Based on a Tag

The following rules can be followed, in accordance with some embodiments (illustrated with an example of ANY/PS links):

Traffic not belonging to a particular category can only be forwarded on ANY-links.

Traffic not belonging to a particular category cannot be forwarded on links restricted to traffic from the particular category.

Traffic from the particular category can be forwarded on either ANYlinks or links restricted to traffic from the particular category.

Therefore, when a packet is received its tag is examined to determine the category. (for example: PS-traffic or non-PS-traffic). For high priority traffic, for example, the best interface (lowest metric) toward the next-hop is used for forwarding, irrespective of its link type. For low priority-traffic, the best interface toward the next hop over only ANY-links is used for forwarding; the high priority links are explicitly excluded.

For optimization purposes, it will be appreciated that instead of requiring a lookup first into the routing table (to find the next-hop) and then into the neighbor table to find the best interface for this particular traffic (PS or non-PS), the best interface information could be maintained in the routing/forwarding table. Note: that the next-hop for both PStraffic and non-PS-traffic will be the same for any destination.

Using the protocol modifications described herein, a network can ensure that traffic of other categories never traverses links restricted to a particular traffic category. Furthermore, the modifications are relatively simple and straight-forward, allowing them to be easily integrated into existing products.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of differentiated routing in a multi-hop multi-radio wireless network, the method comprising:
   for each of a plurality of communication links, identifying a link type of the communication link as one of a restricted link and an ANY link;
   broadcasting a route request from a source node, wherein the route request includes a category of traffic, wherein the route request is broadcast on the restricted links and the ANY links when the category of traffic comprises a particular category of traffic, and further wherein the route request is broadcast only on the ANY links when the category of traffic is not the particular category of traffic.

2. A method as claimed in claim 1, wherein the particular category of traffic comprises public safety traffic.

3. A method as claimed in claim 1, wherein the category of traffic is included in a tag within the route request.

4. A method as claimed in claim 1, wherein the route request further comprises a source address and a destination address, the method further comprising at each node receiving the route request:
   identifying the category of traffic using the source address and the destination address.

5. A method as claimed in claim 1, further comprising:
   forwarding a route reply along a route from a node to the source node, wherein the route reply includes the category of traffic from the route request, wherein the forwarding of the route reply comprises at each of a plurality of nodes along the route:
      selecting a best available route toward the source node by:
         calculating a combined route metric for each of a plurality of routes between the node and the source node, wherein the combined route metric calculation includes a scaling factor for increasing a route metric of each of the restricted links; and
         selecting the route with the lowest combined route metric.

* * * * *

UNITED STATES PATENT AND TRADEMARK OFFICE
CERTIFICATE OF CORRECTION

| | | |
|---|---|---|
| PATENT NO. | : 8,811,234 B2 | Page 1 of 1 |
| APPLICATION NO. | : 13/406298 | |
| DATED | : August 19, 2014 | |
| INVENTOR(S) | : Hrishikesh Gossain et al. | |

It is certified that error appears in the above-identified patent and that said Letters Patent is hereby corrected as shown below:

IN THE TITLE PAGE:

Item 75, under "Inventors", in Column 1, Line 3, delete "(MY);" and insert -- (IN); --, therefor.

IN THE SPECIFICATION:

In Column 3, Line 7, delete "network;" and insert -- network. --, therefor.

In Column 5, Line 3, delete "as as" and insert -- as --, therefor.

Signed and Sealed this
Third Day of May, 2016

Michelle K. Lee
*Director of the United States Patent and Trademark Office*